US012570357B2

(12) United States Patent　　　(10) Patent No.:　US 12,570,357 B2
Strecker　　　　　　　　　　　　(45) Date of Patent:　　Mar. 10, 2026

(54) METHOD FOR INFLUENCING A MOVEMENT OF A STEERING CONTROL ELEMENT OF A STEER-BY-WIRE STEERING SYSTEM IN A VEHICLE

(71) Applicant: Robert Bosch GmbH, Stuttgart (DE)

(72) Inventor: Joerg Strecker, Pluederhausen (DE)

(73) Assignee: Robert Bosch GmbH, Stuttgart (DE)

( * ) Notice: Subject to any disclaimer, the term of this patent is extended or adjusted under 35 U.S.C. 154(b) by 607 days.

(21) Appl. No.: 17/923,072

(22) PCT Filed: Feb. 4, 2021

(86) PCT No.: PCT/EP2021/052693
§ 371 (c)(1),
(2) Date: Nov. 3, 2022

(87) PCT Pub. No.: WO2021/239275
PCT Pub. Date: Dec. 2, 2021

(65) Prior Publication Data
US 2023/0234640 A1　　　Jul. 27, 2023

(30) Foreign Application Priority Data
May 25, 2020　(DE) ..................... 10 2020 206 435.0

(51) Int. Cl.
B62D 6/00　　　(2006.01)
B62D 5/00　　　(2006.01)

(52) U.S. Cl.
CPC .............. B62D 6/008 (2013.01); B62D 5/006 (2013.01)

(58) Field of Classification Search
CPC ......... B62D 6/008; B62D 5/006; B62D 5/005
See application file for complete search history.

(56) References Cited

U.S. PATENT DOCUMENTS

2006/0025911 A1*　2/2006　Yao .......................... B62D 5/006
　　　　　　　　　　　　　　　　180/443
2006/0086560 A1*　4/2006　Furusho ............... B62D 5/0463
　　　　　　　　　　　　　　　　180/446

(Continued)

FOREIGN PATENT DOCUMENTS

DE　　　202004017030 U1　　3/2005
DE　　10 2009 053 226 A1　　5/2011

(Continued)

OTHER PUBLICATIONS

International Search Report corresponding to PCT Application No. PCT/EP2021/052693, mailed May 6, 2021 (German and English language document) (5 pages).

*Primary Examiner* — Jason D Shanske
*Assistant Examiner* — Scott Lawrence Strickler
(74) *Attorney, Agent, or Firm* — Maginot, Moore & Beck LLP

(57)　　　　　　ABSTRACT

The disclosure relates to a method for influencing a movement of a steering control element of a steer-by-wire steering system in a vehicle, in particular a motor vehicle, in which method the steer-by-wire steering system comprises at least one feedback actuator for producing a steering resistance and/or a restoring torque acting on the steering control element. In at least one operating state in which the vehicle is stationary and is in a passive operating mode which is different from a normal driving operating mode, as a response to an external force acting on the steering control element, the steering resistance and/or the restoring torque of the feedback actuator are/is set and/or changed by means of a simulation function in such a way that a behavior of the steering control element which correlates with a bore torque and/or self-aligning torque is simulated.

15 Claims, 3 Drawing Sheets

(56)        References Cited

U.S. PATENT DOCUMENTS

2006/0201733  A1*   9/2006  Dominke  ..............  B62D 5/005
                                                            180/402
2020/0023894  A1     1/2020  Naik et al.

FOREIGN PATENT DOCUMENTS

| DE | 10 2016 005 013 A1 | 10/2017 |
| DE | 10 2018 123 241 A1 | 3/2019 |
| DE | 10 2017 222 952 A1 | 6/2019 |
| DE | 10 2019 103 712 B3 | 3/2020 |
| JP | H6-305433 A | 11/1994 |
| JP | 2009-67375 A | 4/2009 |
| JP | 2011-11660 A | 1/2011 |
| JP | 2014-133524 A | 7/2014 |
| JP | 2018-94966 A | 6/2018 |

* cited by examiner

METHOD FOR INFLUENCING A MOVEMENT OF A STEERING CONTROL ELEMENT OF A STEER-BY-WIRE STEERING SYSTEM IN A VEHICLE

This application is a 35 U.S.C. § 371 National Stage Application of PCT/EP2021/052693, filed on Feb. 4, 2021, which claims the benefit of priority to Serial No. DE 10 2020 206 435.0, filed on May 25, 2020 in Germany, the disclosures of which are incorporated herein by reference in their entirety.

BACKGROUND

The disclosure relates to a method for influencing a movement of a steering control element of a steer-by-wire steering system in a vehicle. In addition, the disclosure relates to a control device with a computing unit for implementing such a method, and to a vehicle with a computing unit for implementing such a method.

From the prior art, vehicles are known which comprise a conventional steering system with a steering wheel, a steering angle adjuster in the form of a steering gear, and a steering column for mechanically connecting the steering wheel to the steering angle adjuster. In a passive operating mode, i.e. in an operating mode before an operation start and without steering assistance, for example when the ignition is switched on, or without mechanical locking of the steering, relatively high torques and/or forces act on the steering system when the steering wheel is turned and a vehicle wheel is turned as a result. These high torques and/or forces are produced in particular by a bore torque and/or self-aligning torque when the vehicle is stationary. When the steering wheel is released after a deflection, the vehicle wheels relax again, which results in a defined movement of the steering wheel. The steering wheel thereby initially executes a larger movement in order to subsequently come to a standstill with slight oscillation. Such behavior can be advantageous, for example upon entering and/or exiting the vehicle, since in this event the driver can hold on to and/or brace against the steering wheel.

In addition, vehicles with steer-by-wire steering systems are known which do not require a direct mechanical connection between a steering control element and steered vehicle wheels, and in which a steering command at the steering control element is transmitted only electrically. Such steering systems comprise a steering input unit with a feedback actuator for producing a steering resistance and/or a restoring torque on the steering control element, as well as at least one steering angle adjuster which is mechanically separated from the steering input unit. In the passive operating mode mentioned above, the feedback actuator is normally switched off and/or inactive and has only a low inherent moment of resistance. However, the forces and/or torques that are thereby active are not sufficient for bracing against the steering control element. Even upon active operation of the feedback actuator, a produced steering resistance and/or a produced restoring torque is normally not sufficient to realize such a function.

The object of the disclosure is, in particular, to provide a method for influencing a movement of a steering control element of a steer-by-wire steering system in a vehicle, which method has improved properties with regard to a behavior of the steering control element in a passive operating mode. The object is achieved by the features of the claims and advantageous embodiments and developments of the disclosure can be found in the dependent claims.

SUMMARY

A method for influencing a movement of a steering control element of a steer-by-wire steering system in a vehicle, in particular a motor vehicle, is proposed, wherein the steer-by-wire steering system comprises at least one feedback actuator for producing a steering resistance and/or a restoring torque on the steering control element; and wherein, in at least one operating state in which the vehicle is stationary and in a passive operating mode, which is different from a normal driving operating mode, in response to an external force acting on the steering control element, the steering resistance and/or the restoring torque of the feedback actuator is set and/or changed by means of a simulation function in such a way that a behavior of the steering control element which correlates with a bore torque and/or self-aligning torque, and advantageously corresponds to a conventional steering system, is simulated. Via this embodiment, in particular a behavior of the steering control element in a passive operating mode can be improved in that a behavior familiar to a driver is advantageously simulated. In particular, by adapting the steering resistance and/or the restoring torque of the feedback actuator, a corresponding support function can also be provided, whereby the driver can hold onto and/or brace against the steering control element, for example upon entering and/or exiting the vehicle. Moreover, a steering feel, in particular a steering feel that is perceptible at the steering control element, can advantageously be improved.

The steer-by-wire steering system comprises in particular the steering control element. Moreover, the steer-by-wire steering system can comprise further components and/or assemblies such as at least one steering input unit, which in particular comprises the steering control element and/or the feedback actuator; at least one steering angle adjuster, designed for example as a central adjuster or single wheel adjuster and advantageously mechanically separated from the steering input unit; at least one control device, in particular designed as a steering control device, which is provided in particular for the electrical coupling of the steering input unit and the steering angle adjuster; and/or at least one detection unit for detecting and/or monitoring an operating state of the vehicle, for detecting and/or monitoring a movement of the steering control element produced by the external force action, and/or for detecting and/or monitoring at least one state parameter correlated with a surface below the vehicle, using which state parameter in particular a state of the surface can be inferred and a bore torque and/or self-aligning torque currently acting on the vehicle wheels can hereby be determined. A "feedback actuator" is to be understood in particular as an actuator unit, in particular an actuator unit which is different from the steering angle adjuster and is in direct mechanical connection with the steering control element, which is provided to detect signals, forces, and/or torques from the steering control element, in particular directly, and/or to transmit them to the steering control element, in particular directly. In particular, the feedback actuator is thereby provided at least to produce the steering resistance and/or the restoring torque at the steering control element. The feedback actuator is also provided in particular to adapt a manual torque to be applied by a driver to the steering control element, and/or a steering feel perceptible via the steering control element. For this purpose, the feedback actuator can comprise at least one electric motor. Furthermore, a "passive operating mode" is to be understood in particular as an operating mode in which the vehicle is not in a normal driving mode and/or at least one operating function activated in the normal driving mode is deactivated and/or disconnected, such as in a shut-off and/or parked state of the vehicle. The passive operating mode thereby corresponds in particular to an operating mode before an operation start and/or before an ignition. The passive operating mode is preferably an in particular energy-saving idle operating mode and/or an in particular energy-saving standby operating mode. In addition, it is advantageously proposed that at least one traction motor of the vehicle is switched off in the passive operating mode. Advantageously, the passive operating mode is also different from a simple start/stop operating mode.

Moreover, the vehicle and/or the steer-by-wire steering system comprises in particular at least one computing unit which is provided to implement the method for influencing the movement of the steering control element. A "computing unit" is thereby to be understood in particular as an electrical and/or electronic unit which has an information input, information processing, and an information output. Advantageously, the computing unit further comprises at least one processor, at least one operating memory, at least one input and/or output means, at least one operating program, at least one open-loop control routine, at least one closed-loop control routine, at least one calculation routine, and/or at least one evaluation routine. In addition, the computing unit comprises in particular the simulation function. In particular, the computing unit is provided to determine and/or monitor an operating state of the vehicle and/or a movement of the steering control element caused by the external force action. In addition, in an operating state in which the vehicle is stationary and in a passive operating mode different from a normal driving operating mode, the computing unit is provided in particular to set and/or change the steering resistance and/or the restoring torque of the feedback actuator, in particular by means of the simulation function and by controlling the feedback actuator, in response to an external force acting on the steering control element, in particular such that a steering behavior correlated with a bore torque and/or self-aligning torque is simulated. The computing unit is thereby preferably provided to produce an output moment by means of the simulation function, on the basis of a movement of the steering control element caused by the external force action, which output moment can be used directly as a target specification, in particular in the form of a target motor torque or a target manual torque, for the feedback actuator or for determining the target specification, in particular in the form of a target motor torque or a target manual torque, for the feedback actuator. Thus, in the passive operating mode, a steering resistance and/or a restoring torque, which corresponds to the movement of the vehicle wheels while the vehicle is stationary and is correlated with a bore torque and/or self-aligning torque, is particularly preferably simulated on the steering control element by means of the simulation function. Preferably, the computing unit is further integrated into a control device of the vehicle, or preferably into the control device which is designed in particular as a steering control device. "Provided" is to be understood in particular as specially programmed, designed, and/or equipped. The fact that an object is provided for a specific function is to be understood in particular to mean that the object fulfills and/or executes this specific function in at least one application and/or operating state.

It is further proposed that, for activation of the simulation function, a plurality of activation conditions, such as an ignition status and/or an ignition signal, in particular in the case of a combustion vehicle, a start status and/or a start signal, in particular in the case of an electric vehicle, a closed state of a vehicle door of the vehicle, a signal of a vehicle key, a movement status of the vehicle; an operating status of the traction motor of the vehicle, and/or an operating status of the steer-by-wire steering system are monitored and, in the operating state, an activation signal is determined and/or generated, in particular by means of an activation function and on the basis of the activation conditions. The activation signal can thereby in particular be formed from a single one of the activation conditions or from a combination of several of the activation conditions. In particular, at least the simulation function can be activated by the activation signal. Moreover, an on-board vehicle electrical system of the vehicle can advantageously be activated and/or started up by the activation signal. In particular, the activation signal is provided at least for activation of a power supply of the feedback actuator. Moreover, the activation signal can advantageously also be used to determine the output moment of the simulation function and/or the target specification for the feedback actuator, and/or be taken into account in the determination of the output moment of the simulation function and/or the target specification for the feedback actuator. It is additionally particularly preferably proposed that the activation signal is a binary signal. In particular, a particularly simple and/or exact activation of the simulation function can hereby be achieved. In addition, operational reliability can be advantageously increased.

Moreover, it is proposed that, on the basis of a movement of the steering control element caused by the external force action, in particular in the form of a deflection of the steering control element, a movement speed of the steering control element, and/or an acceleration of the steering control element, an output moment, in particular the already aforementioned output moment, is produced by means of the simulation function and is used to determine a target specification for the feedback actuator, wherein the output moment is composed of a plurality of partial moments correlated with the bore torque and/or self-aligning torque. The bore torque and/or self-aligning torque is thereby characterized in particular by a hysteresis and a spring-damper characteristic. In particular, the output moment is composed of at least two, preferably at least three, and particularly preferably at least four partial moments. In particular, a particularly realistic behavior of the steering control element in the passive operating mode can hereby be simulated.

If the simulation function comprises at least one spring module by means of which a partial moment formed as a spring moment is determined, in particular a spring characteristic which is correlated with the bore torque and/or self-aligning torque and is or would be transmitted to the steering control element, in particular via the vehicle wheels, can advantageously be simulated. Preferably, the partial moment formed as a spring moment is thereby determined on the basis of an advantageously modified deflection of the steering control element. Moreover, the partial moment formed as a spring moment is advantageously determined using a characteristic curve characterizing a spring characteristic.

In addition, it is proposed that steering dynamics of the steering control element and/or steering dynamics at the steering control element are taken into account in the determination of the partial moment formed as a spring moment. In particular, the steering dynamics are thereby taken into account at least when steering the steering control element back into a neutral position, and/or when reducing the deflection of the steering control element relative to the neutral position of the steering control element. In this instance, the partial moment formed as a spring moment is preferably modified and preferably reduced on the basis of the steering dynamics, wherein in particular the partial moment formed as a spring moment is reduced more quickly in the case of high steering dynamics and is reduced more slowly in the case of low steering dynamics. The partial moment formed as a spring moment, and consequently the output moment of the simulation function, can hereby advantageously be varied on the basis of the steering dynamics. In particular, a greater modification of the partial moment formed as a spring moment can thereby be achieved if the driver suddenly takes his hands off the steering control element after a deflection of said steering control element, and a lesser modification of the partial moment formed as a spring moment can be achieved if the driver actively steers back slowly after a deflection of the steering control element.

According to a further embodiment, it is proposed that the simulation function comprises at least one friction module by means of which a partial moment formed as a friction moment is determined. Preferably, the partial moment formed as a friction moment is thereby determined on the basis of a movement speed of the steering control element. In particular a friction characteristic which is correlated with the bore torque and/or self-aligning torque and is or would be transmitted in particular via the vehicle wheels to the steering control element can hereby be advantageously simulated.

It is further proposed that the simulation function comprises at least one damping module by means of which a partial moment formed as a damping moment is determined. Preferably, the partial moment formed as a damping moment is thereby determined on the basis of a movement speed of the steering control element. In addition, the damping moment can advantageously be direction-dependent and, for example, be applied differently with increasing spring moment and/or decreasing spring moment. In particular a damping characteristic which is correlated with the bore torque and/or self-aligning torque and is or would be transmitted in particular via the vehicle wheels to the steering control element can hereby be advantageously simulated.

According to a preferred embodiment, it is also proposed that the simulation function comprises at least one inertia module by means of which a partial moment formed as a moment of inertia is determined. Preferably, the partial moment formed as a moment of inertia is thereby determined on the basis of an acceleration of the steering control element. Particularly advantageously, the acceleration is further determined, in particular calculated, from the movement speed of the steering control element. In particular an inertia which is correlated with the bore torque and/or self-aligning torque and is or would be transmitted in particular via the vehicle wheels to the steering control element can hereby be advantageously simulated.

In addition, it is advantageously proposed that the steer-by-wire steering system comprises at least one steering angle adjuster, in particular the steering angle adjuster already mentioned above, which is provided, at least in a normal driving mode, for changing a steering angle of at least one vehicle wheel on the basis of a steering command at the steering control element. In the operating state in which the vehicle is stationary and in the passive operating mode, the steering angle adjuster could thereby in particular be inactive and/or unoperated, so that the steering angle remains unchanged in the operating state depending on the external force action. However, it is preferably proposed that the steering angle adjuster is active and/or activated in the operating state in which the vehicle is stationary and in the passive operating mode, and the steering angle is changed in the operating state on the basis of the external force acting on the steering control element, in particular in such a way that the vehicle wheel is moved along with the steering control element. In particular, a bore torque and/or self-aligning torque currently acting on the vehicle wheels can hereby advantageously be determined exactly, and a particularly realistic behavior of the steering control element in the passive operating mode can be simulated.

The method for influencing the movement of the steering control element should not hereby be limited to the application and embodiment described above. In particular, the method for influencing the movement of the steering control element in order to fulfill a mode of operation described herein can include a number of individual elements, components and units that deviates from a number mentioned herein.

BRIEF DESCRIPTION OF THE DRAWINGS

Further advantages result from the following description of the drawings. An exemplary embodiment of the disclosure is illustrated in the drawings.

In the drawings.

DETAILED DESCRIPTION

Figure 1A:
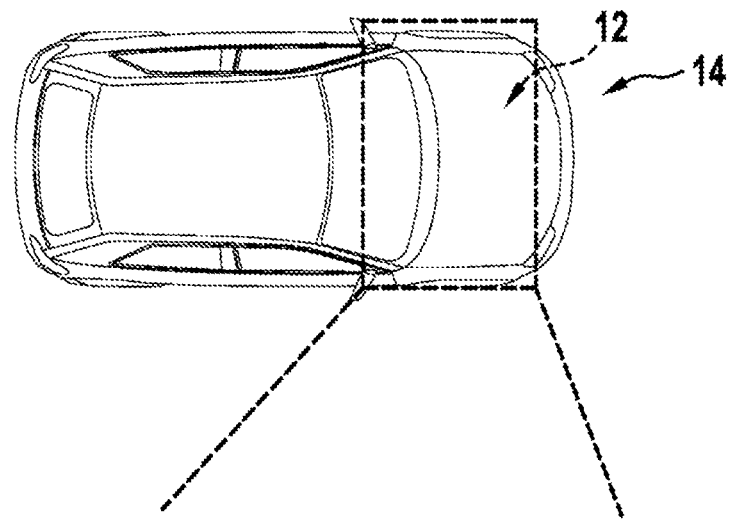
FIG. 1*a-b* show a vehicle with a steer-by-wire steering system in a simplified illustration
Figure 1B:
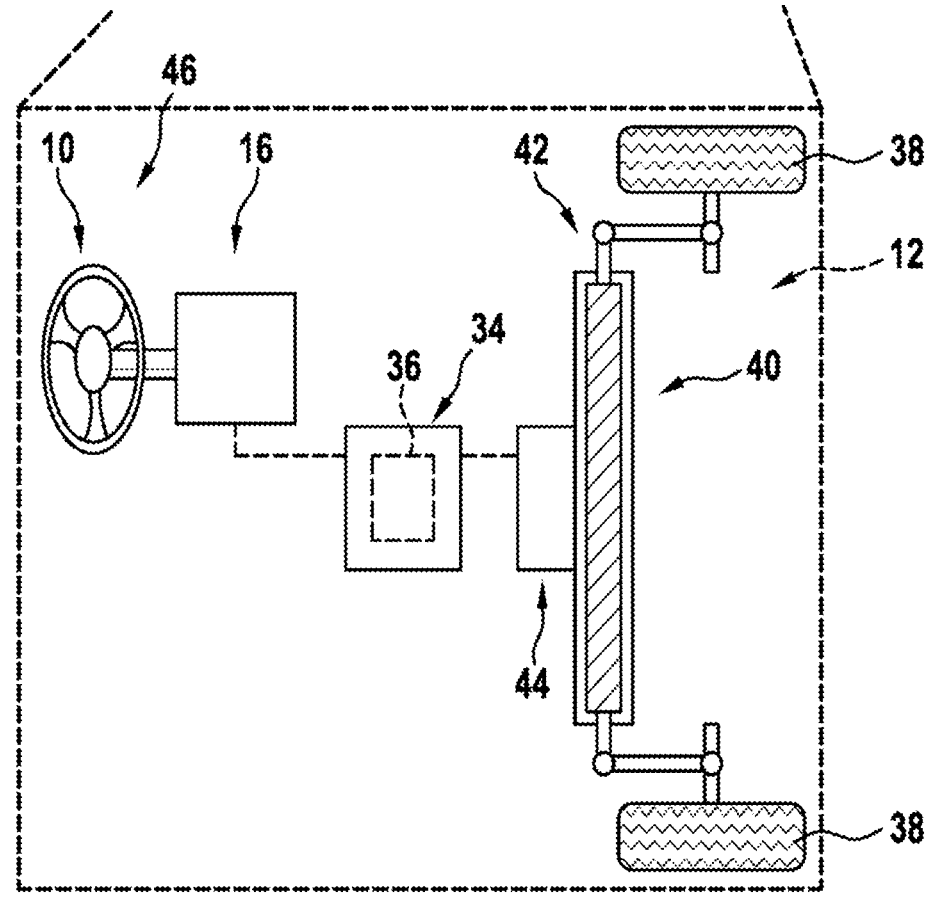

FIGS. 1*a* and 1*b* show an example of a vehicle 14 designed as a passenger vehicle, having a plurality of vehicle wheels 38 and having a steer-by-wire steering system 12, in a simplified illustration. The steer-by-wire steering system 12 has an operative connection with the vehicle wheels 38 and is provided for influencing a direction of travel of the vehicle 14. In the present instance, a steering command is exclusively relayed electrically to the vehicle wheels 38 for this purpose.

The steer-by-wire steering system 12 has a steering angle adjuster 40 known per se. The steering angle adjuster 40 is designed as a central adjuster, for example. The steering angle adjuster 40 has an operative connection with at least two of the vehicle wheels 38, in particular two front wheels, and for this purpose is provided to convert a steering command into a steering movement of the vehicle wheels 38. For this purpose, the steering angle adjuster 40 comprises, as an example, a steering adjustment element 42 designed as a toothed rack and a steering actuator 44 interacting with the steering adjustment element 42, which steering actuator comprises in particular at least one electric motor (not shown). In principle, a steering system could of course also comprise a plurality of steering angle adjusters, in particular designed as single wheel adjusters, or a combination of a steering angle adjuster designed as a central adjuster and a steering angle adjuster designed as a single wheel adjuster.

Moreover, the steer-by-wire steering system 12 comprises a steering input unit 46. The steering input unit 46 is connected purely electrically to the steering angle adjuster 40. The steering input unit 46 comprises a steering control element 10, for example in the form of a steering wheel, for applying a manual torque, and a feedback actuator 16, in particular one that is mechanically coupled to the steering control element 10. The feedback actuator 16 is provided to detect, in particular directly, signals, forces, and/or torques from the steering control element 10, and/or to transmit them, in particular directly, to the steering control element 10. In the present instance, the feedback actuator 16 is provided at least to produce a steering resistance and/or a restoring torque at the steering control element 10. For this purpose, the feedback actuator 16 comprises at least one electric motor (not shown). Alternatively, a steering control element could also be designed as a steering lever and/or steering ball or the like. Moreover, a feedback actuator could also comprise a plurality of electric motors.

Furthermore, the steer-by-wire steering system 12 has a control device 34. The control device 34 is consequently designed as a steering control device. The control device 34 has an electrical connection to the steering angle adjuster 40. The control device 34 also has an electrical connection to the steering input unit 46. The control device 34 thus couples the steering angle adjuster 40 to the steering input unit 46. The control device 34 is provided for controlling an operation of the steer-by-wire steering system 12. The control device 34 is provided to control the steering actuator 44 on the basis of a signal of the steering input unit 46, for example on the basis of a steering command and/or a manual torque. The control device 34 is further provided to control the feedback actuator 16 on the basis of a signal of the steering angle adjuster 40.

For this purpose, the control device 34 comprises a computing unit 36. The computing unit 36 comprises at least one processor (not shown), for example in the form of a microprocessor, and at least one operating memory (not shown). In addition, the computing unit 36 comprises at least one operating program stored in the operating memory, having at least one open-loop control routine, at least one closed-loop control routine, at least one calculation routine, and at least one evaluation routine. The computing unit 36 comprises a control function (not shown) known per se for controlling the feedback actuator 16 in a normal driving mode. In addition, in the present instance the computing unit 36 comprises a simulation function 18 for controlling the feedback actuator 16 (see in particular FIGS. 2*a*-*b*). Alternatively, a control device could also be different from a steering control device and, for example, can be designed as a central control device of a vehicle.

Moreover, the vehicle 14 and/or the steer-by-wire steering system 12 can comprise further components and/or assemblies, such as a first detection unit (not shown) for detecting and/or monitoring an operating state of the vehicle 14; a second detection unit (not shown) for detecting and/or monitoring a movement of the steering control element 10 caused by an external force action; and/or a third detection unit (not shown) for detecting and/or monitoring at least one state parameter correlated with a surface below the vehicle 14, using which state parameter in particular a state of the ground can be inferred and a bore torque and/or self-aligning torque currently acting on the vehicle wheels 38 can hereby be determined as a result. In addition, the vehicle 14 can comprise at least one traction motor (not shown) and/or at least one on-board vehicle electrical system (not shown). In principle, however, a first detection unit, a second detection unit, and/or a third detection unit could also be dispensed with.

In the case of a conventional steering system with mechanical control, in a passive operating mode, i.e. in an operating mode before an operation start and without steering assistance, relatively high torques and/or forces act on the steering system when a steering wheel is turned and a vehicle wheel is turned as a result. These high torques and/or forces are produced in particular by a bore torque and/or self-aligning torque when the vehicle is stationary, and are transmitted from the vehicle wheel to the steering wheel. The properties of the bore torque and/or self-aligning torque can thereby be compared in particular with a hysteresis and a spring-damper characteristic. When the steering wheel is released after a deflection, the vehicle wheels relax again, which results in a defined movement of the steering wheel. Such behavior can also be advantageous, for example upon entering and/or exiting the vehicle, since in this event the driver can hold on to and/or brace against the steering wheel.

In steer-by-wire steering systems, a feedback actuator is generally switched off and/or inactive in a passive operating mode and has only a low inherent moment of resistance, wherein the forces and/or torques that are thereby active are not sufficient for bracing against the steering control element. For this reason, it is proposed according to the disclosure to simulate an aforementioned behavior corresponding to a conventional steering system.

Figure 2A:
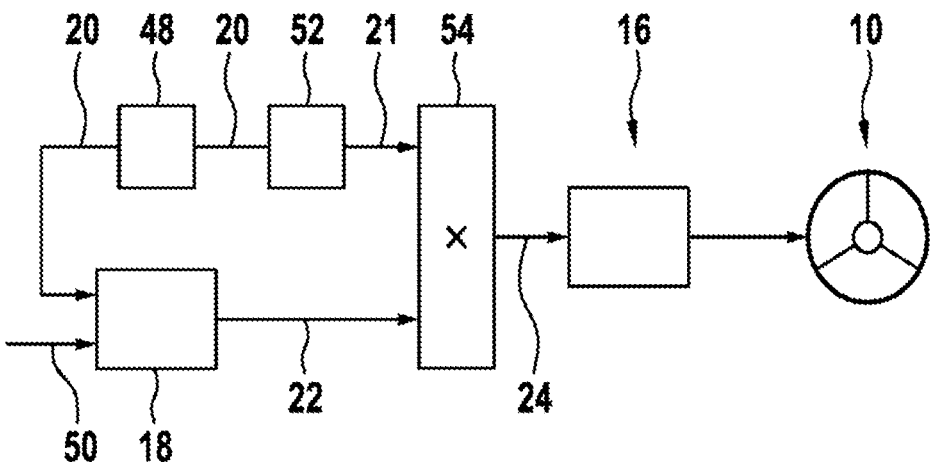
FIG. 2*a-b* show an exemplary signal flow diagram of a method for influencing a movement of a steering control element of the steer-by-wire steering system by means of a simulation function.
Figure 2B:
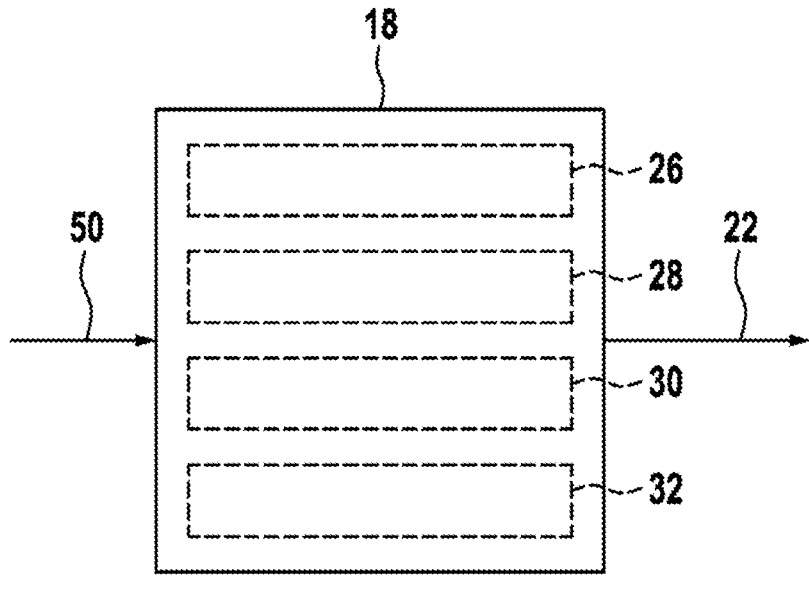

With reference to FIGS. 2*a* and 2*b*, an exemplary method for influencing a movement of the steering control element 10 of the steer-by-wire steering system 12 is explained below. In the present instance, the computing unit 36 is provided to execute the method and, for this purpose, has in particular the simulation function 18 and a computer program with corresponding program code means. The simulation function 18 can be activated in particular instead of the control function for controlling the feedback actuator 16 in the normal driving mode, or advantageously in parallel with the control function for controlling the feedback actuator 16 in the normal driving mode. A parallel operation of the control function and the simulation function 18 thereby offers advantages in particular if the simulation function 18 is activated or deactivated.

According to the disclosure, in at least one operating state in which the vehicle 14 is stationary and in a passive operating mode different from a normal driving operating mode, the steering resistance and/or the restoring torque of the feedback actuator 16 is set and/or changed by means of the simulation function 18, in response to an external force acting on the steering control element 10, in such a way that a behavior of the steering control element 10 correlated with a bore torque and/or self-aligning torque is simulated. The passive operating mode corresponds to an idle operating mode and/or a standby operating mode in which the traction motor of the vehicle 14 is in particular switched off.

Since, in such a passive operating mode, various operating functions activated in the normal driving mode can be deactivated and/or switched off, in particular in order to save energy, it must be ensured in a first step that the simulation function 18 has been and/or is activated. For this purpose, the computing unit 36 comprises an activation function 48. A plurality of activation conditions, such as an ignition status and/or an ignition signal, a start status and/or a start signal, a closed state of a vehicle door of the vehicle 14, a movement status of the vehicle 14, an operating status of the traction motor of the vehicle 14, and/or an operating status of the steer-by-wire steering system 12, are monitored by means of the activation function 48. If it is detected that the vehicle 14 is stationary and in the passive operating mode, an activation signal 20 is generated by means of the activation function 48 and depending on the activation conditions. The activation signal 20 may thus depend on multiple activation conditions in order to ensure an activation only in a desired and/or defined situation. In the present instance, the activation signal 20 is a binary signal. The activation signal 20 is provided at least for activation of the simulation function 18 and is accordingly transmitted to the simulation function 18 (see in particular FIG. 2*a*). In addition, in the operating state it must also be ensured that the feedback actuator 16 is activated in a correspondingly short time in order to be able to provide the steering resistance and/or the restoring torque. For this reason, the on-board vehicle electrical system of the vehicle 14 and/or a power supply of the feedback actuator 16 can advantageously also be activated and/or started up via the activation signal 20. If the vehicle wheels 38 should also move along with the steering control element 10 in the operating state, the activation signal 20 can also be provided for activating the steering actuator 44. In particular, the on-board vehicle electrical system of the vehicle 14 and/or a power supply of the steering actuator 44 can thus also be activated and/or started up via the activation signal 20. In principle, however, an activation signal could also be designed as a signal differing from a binary signal. It is also conceivable to keep a simulation function active in a passive operating mode, as a result of which an activation of the simulation function could be dispensed with. In addition, it is conceivable to activate an on-board vehicle electrical system, a power supply of a feedback actuator, and/or a power supply of a steering actuator by means of a further activation signal. Moreover, a steering actuator could in particular also be inactive and/or unoperated in an operating state in which a vehicle is stationary and in a passive operating mode, so that an activation of the steering actuator could in principle also be dispensed with.

In the operating state in which the vehicle 14 is in particular stationary and in the passive operating mode, a force action on the steering control element 10 is also monitored, and a movement parameter 50 correlated with the force action on the steering control element 10 and with a movement of the steering control element 10 is provided. The movement parameter 50 can, for example, comprise a deflection of the steering control element 10, a movement speed of the steering control element 10, and/or an acceleration of the steering control element 10. The movement parameter 50 is likewise forwarded to the simulation function 18 and serves as an input variable for the simulation function 18.

If the simulation function 18 is in the activated state, and if a force action on the steering control element 10 and a resulting movement of the steering control element 10 is detected, in particular by means of the movement parameter 50, an output moment 22 is generated by means of the simulation function 18 on the basis of the movement of the steering control element 10 caused by the external force action. The output moment 22 is used to determine a target specification 24 for the feedback actuator 16.

Moreover, in the present instance the activation signal 20 is used to determine the target specification 24 for the feedback actuator 16. For this purpose, the activation signal 20 is initially limited by means of a limiter 52 of the computing unit 36, as a result of which a modified activation signal 21 is produced. A gradient of the activation signal 20 is preferably thereby limited so that the activation signal 20 is limited with respect to dynamics, and/or the modified activation signal 21 is limited with respect to dynamics. Subsequently, the output moment 22 and the modified activation signal 21 are offset against one another, by means of an offsetting routine 54 of the computing unit 36, in order to obtain the target specification 24 for the feedback actuator 16. The modified activation signal 21 thereby serves in particular for superimposing and/or masking the target specification 24 for the feedback actuator 16. Alternatively, however, a use of an activation signal and/or of a modified activation signal for determining a target specification for a feedback actuator could also be dispensed with. In this instance, an output moment of a simulation function could also be used directly as a target specification for a feedback actuator, for example. Moreover, a filter for filtering an output moment of a simulation function and/or the target specification, and/or a limiter for limiting the output moment and/or the target specification to a maximum value, could additionally be used in determining a target specification for a feedback actuator.

Subsequently, in a second step, the computing unit 36 is provided to determine a steering resistance to be set and/or a restoring torque to be set on the basis of the target specification 24, and to control the feedback actuator 16 accordingly. In the present instance, the steering resistance and/or the restoring torque of the feedback actuator 16 in the operating state in which the vehicle 14 is in particular stationary and in the passive operating mode is thereby set and/or changed in such a way that a behavior of the steering control element 10 correlated with a bore torque and/or self-aligning torque is simulated.

In the present instance, the output moment 22 of the simulation function 18 is further composed of a plurality of partial moments correlated with the bore torque and/or self-aligning torque (see in particular FIG. 2*b*).

The simulation function 18 comprises a spring module 26 by means of which a first partial moment formed as a spring moment is determined, whereby advantageously a spring characteristic correlated with the bore torque and/or self-aligning torque can be reproduced. The first partial moment is thereby determined on the basis of a deflection of the steering control element 10, which results in particular from the movement parameter 50. In the present instance, the first partial moment is determined on the basis of a modified steering wheel angle, wherein a maximum value of the steering wheel angle is limited for modification. The first partial moment is also determined using a characteristic curve characterizing a spring characteristic, whereby in particular linear, degressive, and/or exponential spring characteristics can be set. The input variable of the characteristic curve is thereby the modified steering wheel angle. Moreover, steering dynamics of the steering control element 10 and/or steering dynamics at the steering control element 10 are taken into account in determining the first partial moment. In the present instance, the steering dynamics are taken into account at least when steering the steering control element 10 back into a neutral position, and/or when the deflection of the steering control element 10 is reduced, wherein the first partial moment is modified depending on the steering dynamics. The first partial moment is thereby modified in such a way that the first partial moment is reduced correspondingly faster in the case of high steering dynamics and is correspondingly more slowly in the case of low steering dynamics. A greater modification of the first partial moment can hereby be advantageously achieved if the driver suddenly takes his hands off the steering control element 10 after a deflection of said steering control element 10, and a lesser modification of the first partial moment can be achieved if the driver actively steers back slowly after a deflection of the steering control element 10. Alternatively or additionally, however, steering dynamics could also be taken into account in the case of a deflection of a steering control element, thus in the case of an increase in the deflection of the steering control element. It is also conceivable to dispense with the use of a characteristic curve and to use other mathematical relationships to produce a desired spring characteristic.

In addition, the simulation function 18 comprises a friction module 28 by means of which a second partial moment formed as a friction moment is determined, whereby a friction characteristic correlated with the bore torque and/or self-aligning torque can advantageously be simulated. The second partial moment is thereby determined on the basis of a movement speed, in the present instance in particular in the form of a steering angle speed, of the steering control element 10, which results in particular from the movement parameter 50. In the present instance, a hysteresis torque is thereby generated on the basis of the movement speed of the steering control element 10 via a gain factor, wherein the gain factor in particular predetermines a dynamic. In addition, the hysteresis torque can be modified, by means of a low-pass filtering and/or saturation, to form the second partial moment. It may also be expedient to filter the movement speed of the steering control element 10 at the beginning, and/or to eliminate noise via a dead zone. Alternatively or additionally, friction characteristics of a running gear or a running gear behavior could also be simulated with the aid of a friction module.

Furthermore, the simulation function 18 comprises a damping module 30 by means of which a third partial moment formed as a damping moment is determined, whereby a damping characteristic correlated with the bore torque and/or self-aligning torque can advantageously be simulated. The third partial moment is thereby determined on the basis of a movement speed, in the present instance in particular in the form of a steering angle speed, of the steering control element 10, which results in particular from the movement parameter 50. In the present instance, the third partial moment thereby results on the basis of the movement speed of the steering control element 10 multiplied by a further gain factor, wherein filtering and/or limitation can additionally take place. In addition, a gain and/or superposition over the movement speed of the steering control element 10 can take place. The third partial moment could also be direction-dependent and, for example, can be applied differently with increasing spring moment and/or decreasing spring moment.

Moreover, the simulation function 18 comprises an inertia module 32 by means of which a fourth partial moment formed as an moment of inertia is determined, whereby an inertia correlated with the bore torque and/or self-aligning torque can advantageously be simulated. The fourth partial moment is thereby determined on the basis of an acceleration, in the present instance in particular in the form of a steering wheel angle acceleration, of the steering control element 10. In the present instance, the acceleration of the steering control element 10 is determined from the movement speed of the steering control element 10, which results in particular from the movement parameter 50. For this purpose, the movement speed of the steering control element 10 is derived over time and filtered with a filter, advantageously a 2nd order low-pass filter. The fourth partial moment then results by multiplication of the acceleration of the steering control element 10 with an applied and/or applicable inertia factor, wherein filtering and/or limitation can additionally take place. In addition, a gain and/or superposition over the acceleration of the steering control element 10 can take place. Alternatively or additionally, friction characteristics of a running gear or a running gear behavior could also be simulated with the aid of an inertia module.

In principle, it is also conceivable to dispense with a spring module, a friction module, a damping module, and/or an inertia module, and consequently a partial moment formed as a spring moment, as a friction moment, as a damping moment, and/or as a moment of inertia. In particular, an output moment of a simulation function could also comprise a single moment in this context.

Figure 3A:
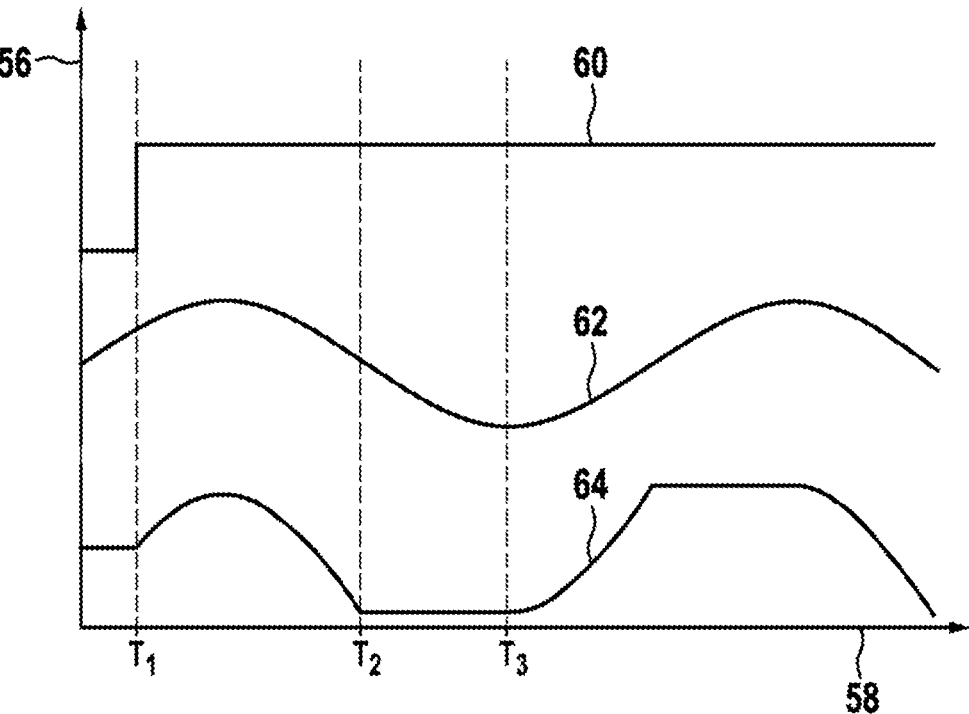
FIG. 3*a-b* show graphs of various signals correlated with an operation of the vehicle.
Figure 3B:
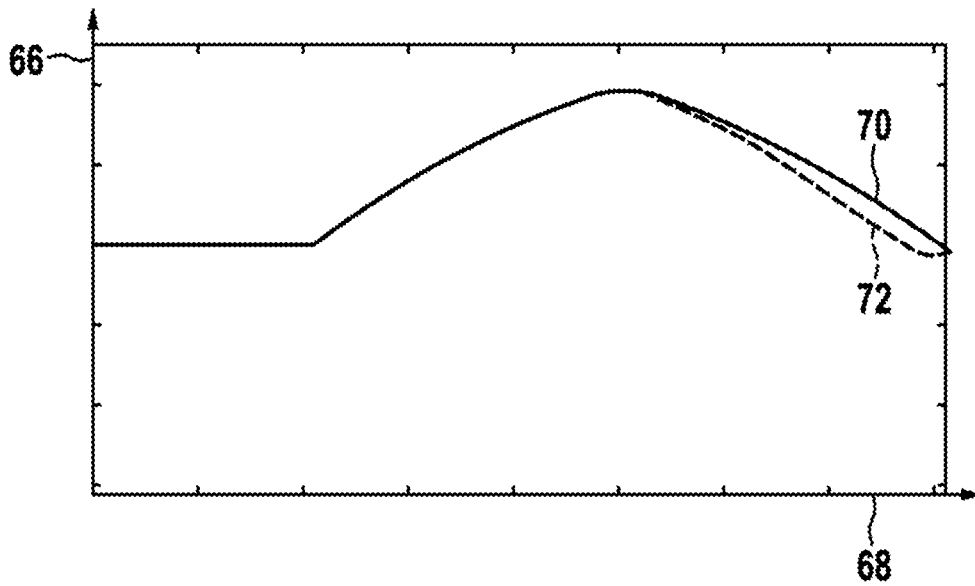

Finally, FIGS. 3a and 3b show exemplary graphs of various signals for influencing the movement of the steering control element 10.

An ordinate axis 56 as a value axis is shown in FIG. 3a. The time is shown on an abscissa axis 58. A curve 60 shows a time profile of the activation signal 20, wherein the simulation function 18 is activated at a time $T_1$. A curve 62 shows a time profile of a deflection of the steering control element 10. In the present instance, the curve 62 shows an exemplary sinusoidal profile of the steering wheel angle. A curve 64 shows a time profile of the modified steering wheel angle, wherein a maximum value of the steering wheel angle is limited. The modified steering wheel angle can thereby, for example, be limited to an amplitude of 15° so that the first partial moment formed as a spring moment achieves the maximum value at the amplitude of 15°. At the point in time $T_1$, the formation of the modified steering wheel angle begins at zero and initially corresponds to the course of the actual steering wheel angle. At the point in time $T_2$, the maximum value is achieved and is kept constant in the following. At the point in time $T_3$, the direction of the actual steering wheel angle changes, wherein at the same point in time the modified steering wheel angle is also reversed. Thus, the absolute zero point of the spring origin changes if the driver steers beyond the maximum value.

A further ordinate axis 66 as a value axis is shown in FIG. 3b. The time is shown on a further abscissa axis 68. A curve 70 shows a time profile of the first partial moment formed as a spring moment, without taking into account the steering dynamics. A curve 72 shows a time profile of the first partial moment formed as a spring moment, taking into account the steering dynamics. The steering dynamics are not taken into account in the case of a deflection of the steering control element 10, i.e. in the case of an increase in the deflection of the steering control element 10, so that curve 70 and curve 72 are identical. In contrast, the steering dynamics are taken into account when steering the steering control element 10 back into a neutral position and/or when the deflection of the steering control element 10 is reduced, wherein the first partial moment is reduced depending on the steering dynamics, whereby in particular the curve 72 runs below the curve 70.

What is claimed is:
1. A method of influencing a movement of a steering control element of a steer-by-wire steering system in a vehicle, wherein the steer-by-wire steering system comprises at least one feedback actuator configured to produce a steering resistance and/or a restoring torque on the steering control element, comprising:
    detecting movement of the steering control element as a result of an external force acting upon the steering control element in at least one operating state in which the vehicle is stationary and in a passive operating mode, which is different from a normal driving operating mode; and setting and/or changing the steering resistance and/or the restoring torque of the feedback actuator using a simulation function such that a behavior of the steering control element which correlates with a bore torque and/or self-aligning torque is simulated.

2. The method according to claim 1, further comprising:

monitoring a plurality of activation conditions;

determining and/or generating, in the at least one operating state, an activation signal on the basis of the activation conditions; and activating the simulation function based upon the determined and/or generated activation signal.

3. The method according to claim 1, further comprising:

producing, using the simulation function, an output moment based upon the movement of the steering control element; and using the output moment to determine a target specification for the feedback actuator, wherein the output moment is composed of a plurality of partial moments correlated with the bore torque and/or self-aligning torque.

4. The method according to claim 3, wherein producing the output moment comprises:

determining a partial moment formed as a spring moment using at least one spring module of the simulation function.

5. The method according to claim 4, wherein the partial moment formed as a spring moment is determined on the basis of a deflection of the steering control element.

6. The method according to claim 4, wherein steering dynamics of the steering control element and/or steering dynamics at the steering control element are taken into account in determining the partial moment formed as a spring moment.

7. The method according to claim 3, wherein producing the output moment comprises:

determining, using at least one friction and/or damping module of the simulation function, a partial moment formed as a friction moment and/or a partial moment formed as a damping moment.

8. The method according to claim 7, wherein the partial moment formed as a friction moment and/or the partial moment formed as a damping moment is determined on the basis of a movement speed of the steering control element.

9. The method according to claim 3, wherein producing the output moment comprises:

determining, using at least one inertia module of the simulation function, a partial moment formed as a moment of inertia.

10. The method according to claim 9, wherein the partial moment formed as a moment of inertia is determined on the basis of an acceleration of the steering control element.

11. A method of influencing a movement of a steering control element of a steer-by-wire steering system in a vehicle, wherein the steer-by-wire steering system comprises at least one feedback actuator configured to produce a steering resistance and/or a restoring torque on the steering control element, comprising:

detecting movement of the steering control element as a result of an external force acting upon the steering control element in at least one operating state in which the vehicle is stationary and in a passive operating mode, which is different from a normal driving operating mode; and setting and/or changing the steering resistance and/or the restoring torque of the feedback actuator using a simulation function such that a behavior of the steering control element which correlates with a bore torque and/or self-aligning torque is simulated;

producing, using the simulation function, an output moment based upon the movement of the steering control element; and using the output moment to determine a target specification for the feedback actuator, wherein the output moment is composed of a plurality of partial moments correlated with the bore torque and/or self-aligning torque, wherein producing the output moment comprises determining a partial moment formed as a spring moment using at least one spring module of the simulation function, and wherein the partial moment formed as a spring moment is determined using a characteristic curve characterizing a spring characteristic.

12. A control device, in particular a steering control device, having a computing unit configured to implement the method according to claim 1.

13. A vehicle comprising:

a steer-by-wire steering system which comprises at least one steering control element and at least one feedback actuator configured to produce a steering resistance and/or a restoring torque on the steering control element; and a computing unit configured to implement the method according to claim 1.

14. The method according to claim 1, wherein the vehicle is a motor vehicle.

15. The method according to claim 1, wherein:

the steering control element is movable as a result of the external force when the vehicle is stationary and in the passive operating mode, and the steering control element is movable as a result of the external force when the feedback actuator is configured according to the simulation function to provide the steering resistance and/or the restoring torque correlating with the bore torque and/or the self-aligning torque.

* * * * *